(12) United States Patent
Weiß

(10) Patent No.: US 11,220,957 B2
(45) Date of Patent: Jan. 11, 2022

(54) EXHAUST GAS TURBOCHARGER

(71) Applicant: IHI Charging Systems International GmbH, Amt Wachsenburg OT Ichtershausen (DE)

(72) Inventor: Marc-Pierre Weiß, Mannheim (DE)

(73) Assignee: IHI Charging Systems International GmbH, Amt Wachsenburg OT Ichtershausen (DE)

( * ) Notice: Subject to any disclaimer, the term of this patent is extended or adjusted under 35 U.S.C. 154(b) by 0 days.

(21) Appl. No.: 17/043,186

(22) PCT Filed: Jun. 5, 2019

(86) PCT No.: PCT/EP2019/000175
§ 371 (c)(1),
(2) Date: Sep. 29, 2020

(87) PCT Pub. No.: WO2020/001805
PCT Pub. Date: Jan. 2, 2020

(65) Prior Publication Data
US 2021/0054783 A1 Feb. 25, 2021

(51) Int. Cl.
*F02C 6/12* (2006.01)
*F01D 17/16* (2006.01)

(52) U.S. Cl.
CPC .............. *F02C 6/12* (2013.01); *F01D 17/165* (2013.01); *F05D 2220/40* (2013.01); *F05D 2240/60* (2013.01); *F05D 2250/232* (2013.01); *F05D 2250/90* (2013.01)

(58) Field of Classification Search
CPC ...... F01D 17/165; F02C 6/12; F05D 2220/40; F05D 2230/64; F05D 2240/60; F05D 2250/232; F05D 2250/90
See application file for complete search history.

(56) References Cited

U.S. PATENT DOCUMENTS

| | | | |
|---|---|---|---|
| 5,758,500 A * | 6/1998 | Sumser | F02B 37/025 60/602 |
| 8,464,528 B2 | 6/2013 | Sausse et al. | |
| 9,988,939 B2 * | 6/2018 | Ishii | F01D 25/125 |
| 10,408,228 B2 * | 9/2019 | Grabowska | F02B 37/24 |
| 10,934,867 B2 * | 3/2021 | Takeda | F01D 9/026 |
| 2006/0034684 A1 | 2/2006 | Metz et al. | |

(Continued)

FOREIGN PATENT DOCUMENTS

DE 102007010840 A1 9/2008
DE 102008020932 A1 10/2009
(Continued)

*Primary Examiner* — Jesse S Bogue
(74) *Attorney, Agent, or Firm* — Smartpat PLC

(57) ABSTRACT

An exhaust gas turbocharger includes a turbine casing (4) within which a turbine wheel (10) is rotatably arranged relative to an axis of rotation (1). A guide vane ring (22) is non-rotatably arranged which comprises variable guide vanes (44) which are arranged upstream of the turbine wheel (10) with respect to an exhaust gas flow. The guide vane ring (22) is centered by means of a matched pair of two contact surfaces (24, 26) pressed against each other with respect to the turbine casing (4), of which at least the one contact surface (24 or 26, respectively) is formed conically.

14 Claims, 2 Drawing Sheets

(56) References Cited

U.S. PATENT DOCUMENTS

| | | | |
|---|---|---|---|
| 2011/0038742 A1* | 2/2011 | Fleig | ............... F01D 25/246 417/406 |
| 2011/0236197 A1 | 9/2011 | Burmeister et al. | |
| 2011/0255955 A1 | 10/2011 | Holzschuh | |
| 2011/0283698 A1 | 11/2011 | Sausse et al. | |
| 2014/0248137 A1 | 9/2014 | Inoue et al. | |
| 2018/0030848 A1 | 2/2018 | Kobayashi et al. | |

FOREIGN PATENT DOCUMENTS

| | | |
|---|---|---|
| DE | 102010015272 A1 | 10/2011 |
| DE | 102014203498 A1 | 9/2014 |
| DE | 102014226862 A1 | 6/2016 |
| DE | 112016001532 | 1/2018 |
| EP | 1642009 B1 | 10/2006 |
| EP | 1734231 A1 | 12/2006 |
| EP | 1536103 B1 | 9/2013 |
| EP | 2302175 B1 | 6/2017 |
| WO | 2007107289 A1 | 9/2007 |

* cited by examiner

EXHAUST GAS TURBOCHARGER

TECHNICAL FIELD

The disclosure relates to an exhaust gas turbocharger.

BACKGROUND

DE 10 2014 203 498 A1 shows an exhaust gas turbocharger with variable turbine geometry. The exhaust gas turbocharger comprises a turbine casing within which a turbine wheel is rotatably arranged relative to an axis of rotation. For realising the variability of the turbine geometry, a guide vane ring is provided, which technically is also referred to as nozzle ring and which comprises variable guide vanes which are pivotable to this end. The variable guide vanes are arranged upstream of the turbine wheel with respect to an exhaust gas flow. The guide vane ring is non-rotationally and radially fixed with respect to the turbine casing and a bearing housing. To this end, the guide vane ring is connected via bolts with a support ring which is designed as a flat disc and fixed between the turbine casing and a bearing housing. The assembly of the turbine casing with the bearing housing, the guide vane ring and the support ring is work-intensive.

WO 2007/107289 A1, U.S. Pat. No. 8,464,528 B2, EP 2 302 175 B1 and EP 1 536 103 B1 each disclose an exhaust gas turbocharger with variable turbine geometry wherein a guide vane ring is pressed against a turbine casing by means of a disc spring.

Both in WO 2007/107289 A1 and in EP 2 302 175 B1, the respective guide vane ring is centered immediately on the bearing housing.

DE 10 2010 015 272 A1 discloses the turbine casing of an exhaust gas turbocharger with variable turbine geometry. A disc spring which serves as a seal is arranged between the turbine casing and the bearing housing.

SUMMARY

It is the object of the present disclosure to create an assembly-friendly exhaust gas turbocharger.

This object is solved by an exhaust gas turbocharger with a turbine casing within which a turbine wheel is rotatably arranged relative to an axis of rotation. A guide vane ring is non-rotatably arranged which comprises variable guide vanes which are arranged upstream of the turbine wheel with respect to an exhaust gas flow.

The guide vane ring is centered relative to the turbine casing by a matched pair of two contact surfaces pressed against each other, of which at least the one of the contact surface is configured conically. This conical contact surface ensures that the other contact surface automatically assumes the correctly centered position due to the force which presses the two contact surfaces against each other.

In a particularly advantageous manner, the one conical contact surface may be arranged at the radial outer area of the guide vane ring.

In particular, the one conical contact surface may be arranged immediately at the guide vane ring. Thereby, a cone angle may form at this conical contact surface, which opens in a direction facing away from an exhaust gas outlet. This means, the vertex of the cone angle lies on the axis of rotation in the direction which axially faces the exhaust gas outlet.

The other conical contact surface may, in particular, be arranged at the turbine casing. At this conical contact surface, too, a cone angle may form which opens in the direction facing away from the exhaust gas outlet. This means, the vertex of the cone angles lies on the axis of rotation in the direction which axially faces the exhaust gas outlet.

The cone angle of at least one of the two contact surfaces may, in particular, range between 120° and 150°. Preferably, both contact surfaces are conical and exhibit the same cone angle. However, it is also possible to configure only the one contact surface conically, while the other contact surface is crowned.

In addition to the centering function, the matched pairing of contact surfaces may have a further function. A matched pair of contact surfaces may, for example, form a seal which essentially separates a space within the exhaust gas flow from a holding space within which a connection mechanism is arranged which connects the guide vanes with an actuating device which is arranged outside the turbine casing and the bearing housing. Said space within the exhaust gas flow may, in particular, be the turbine spiral channel.

If the two contact surfaces are conically formed, it may be provided in a particularly advantageous manner that their matched materials and their cone angles relative to the axis of rotation ensure that no self-locking occurs at the conical centering in the direction of the axis of rotation.

The two contact surfaces may contact each other in an advantageous manner in the axial direction under the preload of a spring, in particular of a disc spring. If, additionally, at least one of the two contact surfaces is conically formed or if both contact surfaces exhibit the same cone angle, this cone angle may be designed in an advantageous manner such that the size of the cone angle ensures that the reduction of a preload of the spring due to thermal expansions of the components of the exhaust gas turbocharger is compensated during its operation. In particular, the size of the cone angle may be designed such that the preload is maintained constant.

In order to not at least directly expose the spring to the hot exhaust gas flow, the spring may be protected by a heat shielding plate which is axially arranged between the spring and the turbine wheel.

In a particularly advantageous development, the spring and the heat shielding plate may be arranged essentially in an axial area of the two contact surfaces.

In an advantageous manner it may be provided that the heat shielding plate exhibits an adequate radial clearance relative to the guide vane ring or the bearing housing, so that centering through the matched pairing of the contact surfaces is ensured.

In a particularly compact embodiment it may be provided that the guide vanes of the guide vane ring are pivotably mounted at a base ring which comprises a radially projecting annular collar at which the one conical contact surface is arranged which abuts the other conical contact surface which is arranged at a radially inward extending shoulder of the turbine casing and that the other conical contact surface is arranged at a side of the shoulder facing away from the turbine spiral channel, while the side of the shoulder facing the turbine spiral channel is formed as part of the inner wall of the turbine spiral channel.

In order to further simplify the assembly, it may be provided that the two contact surfaces are formed conically and without protrusions so that the guide vane ring may be steplessly fixed at the turbine wheel in various angular positions about the axis of rotation.

Further advantages, features and details of the invention result from the following description of preferred exemplary embodiments as well as from the drawing. The above mentioned features and feature combinations in the description of the figures as well as the following features and feature combinations in the description of the figures and/or shown in the figures alone are not only applicable in the indicated combination but also in other combinations or alone without deviating from the scope of the invention. The same or functionally identical elements are assigned identical reference numerals. For the sake of clarity, it may be that the elements are not identified by their reference numerals in all figures, however, without losing their assignment.

DETAILED DESCRIPTION

Figure 1:
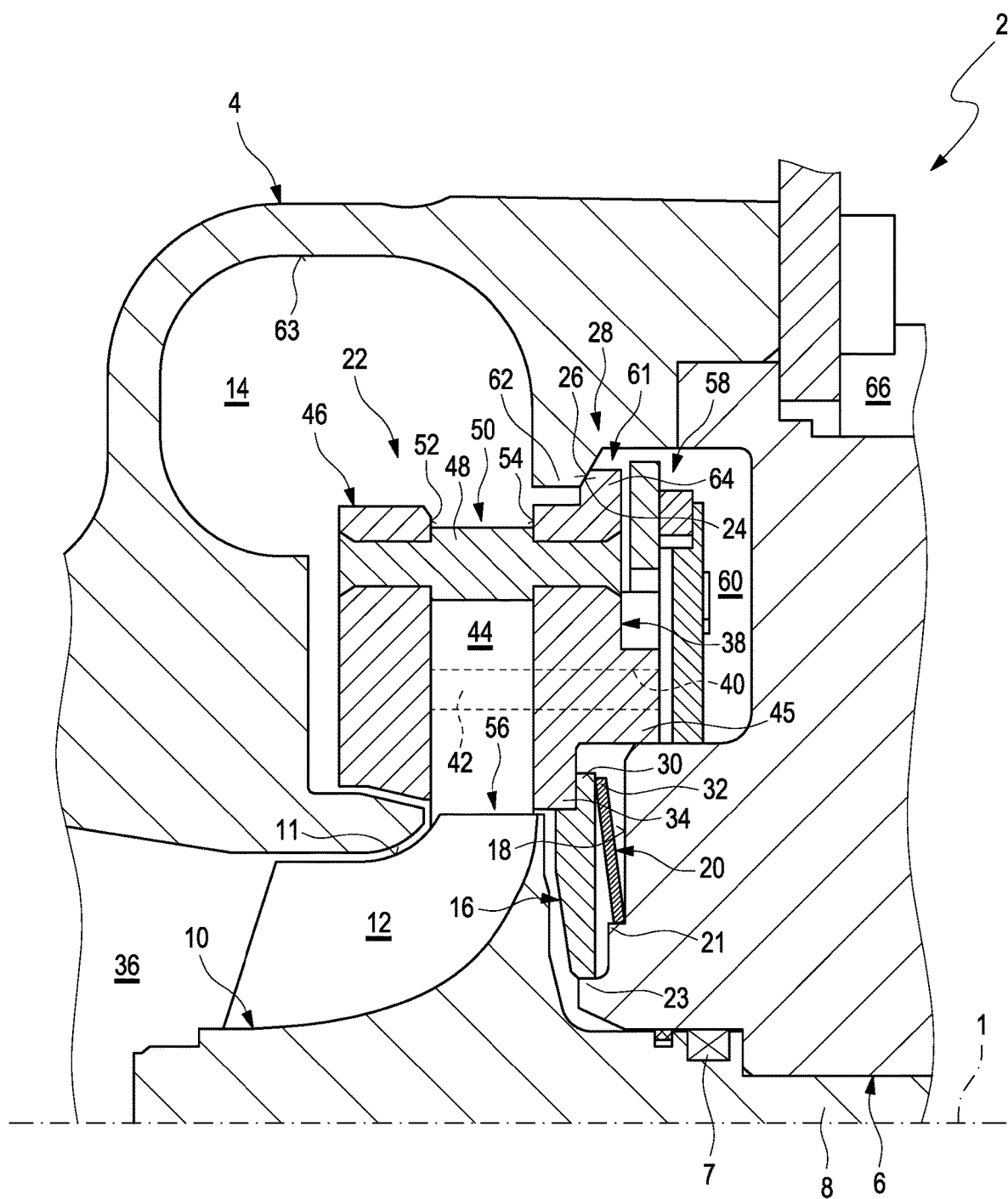
FIG. 1 shows in a longitudinal section along an axis of rotation an exhaust gas turbocharger with variable turbine geometry, which comprises a centering with conical contact surfaces.

FIG. 1 shows an exhaust gas turbocharger 2 with variable turbine geometry in a longitudinal section along an axis of rotation 1. The exhaust gas turbocharger 2 compresses air utilising the exhaust gas energy and supplies the compressed air to a combustion engine (not shown in detail).

The exhaust gas turbocharger 2 comprises—among others—a turbine casing 4 and a bearing housing 6 which is firmly connected with it. Within the bearing housing 6 bearings are arranged for supporting a rotor shaft 8, of which only the one bearing 7 can be seen in the drawing. The rotor shaft 8 is rotatable about the axis of rotation 1. At its end portion (not shown), the rotor shaft 8 is non-rotatably connected with a compressor wheel, and at its other end portion integrally formed with a turbine wheel 10 and as such is non-rotatably connected with the turbine wheel 10 so that the rotor shaft 8 simultaneously represents a turbine shaft.

The turbine wheel 10 rotates about the axis of rotation 1 through the pressure energy of the exhaust gas. The turbine wheel 10 comprises multiple turbine blades 12 equally spaced around the circumference which are integral with the turbine wheel 10. The turbine blades 12 comprise outer edges 11 whose portions downstream of the exhaust gas flow are covered by a covering wall of the turbine casing 4.

A turbine spiral channel 14 is spirally formed at an inlet side of the turbine wheel 10 within the turbine casing 4. The turbine spiral channel 14 is connected with an exhaust gas inlet connection (not shown in the drawing) through which the exhaust gas is introduced for driving the turbine wheel 10.

An annular heat shielding plate 16 is provided for protection against heat from the side of the turbine wheel 10. The heat shielding plate 16 is arranged between the turbine wheel 10 and a lateral surface 18 of the bearing housing 6, which faces the turbine wheel 10. The heat shielding plate 16 is arranged between a spring 20 and the turbine wheel 10. The spring 20 in the form of a disc spring is inserted under preload between the lateral surface 18 of the bearing housing 6 and the heat shielding plate 16. The spring 20 may radially place in position against a shoulder 21 of the bearing housing 6, which is radially further away from the axis of rotation 1 than another shoulder 23 at which the heat shielding plate 16 may radially be placed in position. The spring 20 preloads the heat shielding plate 16 axially against a guide vane ring 22, so that under the preload of the spring 20 two conical contact surfaces 24, 26 of a centering 28 contact each other. This means that the spring 20 presses the two contact surfaces 24, 26 against each other. The matched pair of two conical contact surfaces 24, 26 is located radially outside the spring 20 and is essentially disposed in an axial area of the spring 20 and the heat shielding plate 16.

Here a radially outer peripheral zone 30 of the heat shielding plate 16 is loaded axially between the outer peripheral zone 32 of the spring 20 and an inner peripheral zone 34 of the guide vane ring 22.

The guide vane ring 22 which is also referred to as nozzle unit forms a substantial part of the variable turbine geometry of the exhaust gas turbocharger 2. The guide vane ring 22 represents a passage with variable geometry for the exhaust gas flow which is guided from the turbine spiral channel 14 to the turbine wheel 10 and from there to an axial exhaust gas outlet 36. The guide vane ring 22 is radially arranged between the turbine spiral channel 14 and the turbine wheel 10 and thus also concentrically to the turbine wheel 10 and the rotor shaft 8.

The construction of the guide vane ring 22 will be explained more detailed in the following. A base ring 38 of the guide vane ring 22 is arranged in the turbine casing 4. The base ring 38 comprises multiple mounting holes 40 which are formed as through-holes and are penetrated by swivel shafts 42 which are non-rotatably connected with guide vanes 44. The mounting holes 40 are disposed in a circumferential direction of the base ring 38. The heat shielding plate 16 exhibits a sufficient radial clearance with respect to the guide vane ring 22 and/or the bearing housing 6 so that the centering via the matched pair of the contact surfaces 24, 26 is ensured. This means, the radial clearance ensures that the heat shielding plate 16 cannot simultaneously come into radial contact externally and internally, which due to unavoidable manufacturing inaccuracies might otherwise prevent that the two contact surfaces 24, 26 come into full contact with each other.

For the same reason, namely for securing the centering function at the two contact surfaces 24, 26, an annular shoulder 45 of the base ring 38, which extends in the axially facing away direction from the guide vanes 44 is slightly radially spaced from the bearing housing 6.

A further base ring 46 is connected with the one base ring 38 via multiple stepped bolts 48 which are arranged in the circumferential direction of the guide vane ring 22. Thereby the bolts 48 define an axial intermediate space 50 between the opposing surfaces 52, 54 of the two base rings 38, 46.

The variable guide vanes 44 are arranged between the opposing surfaces 52, 54 of the two base rings 38, 46 such that they surround inlet areas 56 between outer edges 11 of the turbine blades 12. Each guide vane 44 is pivotably supported in the base ring 38 by means of the respective swivel shaft 42.

A connection mechanism 58 is arranged in an annular holding space 60 which is disposed coaxially to the axis of rotation 1 and which is defined by the bearing housing 6, the turbine casing 4 and the one base ring 38. The connection mechanism 58 is connected with the swivel shafts 42 of the guide vanes 44 in such a manner that the guide vanes 44 are pivotable in synchronism in the one or the opposite pivoting direction about the axes of the swivel shafts 42. An actuating device 66 (only schematically shown) is provided for activating the connection mechanism 58 and thus for pivoting the guide vanes 44, which is coupled via a coupling shaft (not shown in the drawing) which penetrates an opening in the bearing housing 6, with the connection mechanism 58.

Optionally, the coupling shaft or a coupling linkage could, however, also be arranged in an opening of the turbine casing 4. In any case, the actuating device 66 may be activated in such a manner that the swivel shafts 42 of the guide vanes 44 may be pivoted.

The holding space 60 is located essentially outside the exhaust gas flow. An inflow of exhaust gas from the turbine spiral channel 14 into the holding space 60 is prevented by the arrangement of the conical contact surface 26 at the radial outer zone 61 of the guide vane ring 22, which is pressed against the conical contact surface 24, so that the matched pair of the contact surfaces 24, 26 has a sealing function in addition to the centering function and thus forms a matched sealing surface pair which separates the turbine spiral channel 14 from the holding space 60 which houses the connection mechanism 58. Thereby, the sealing effect of the matched sealing surface pair is enhanced in particular in that the contact surfaces 24, 26 are in contact with each other under the force of the spring 20.

The conical contact surface 24 is arranged at a radially inward extending shoulder 62 of the turbine casing 4. This other conical contact surface 24 is arranged at a side of the shoulder facing away from the turbine spiral channel 14, while the side of the shoulder 62 facing the turbine spiral channel is formed as part of the inner wall 63 of the turbine spiral channel 14.

The one base ring 38 comprises a radially projecting annular collar 64 at which the one conical contact surface 26 is arranged.

The two conical contact surfaces 24, 26 are configured without protrusions so that the guide vane ring 22 may steplessly be fixed at the turbine wheel 10 in various angular positions about the axis of rotation 1.

Figure 2:
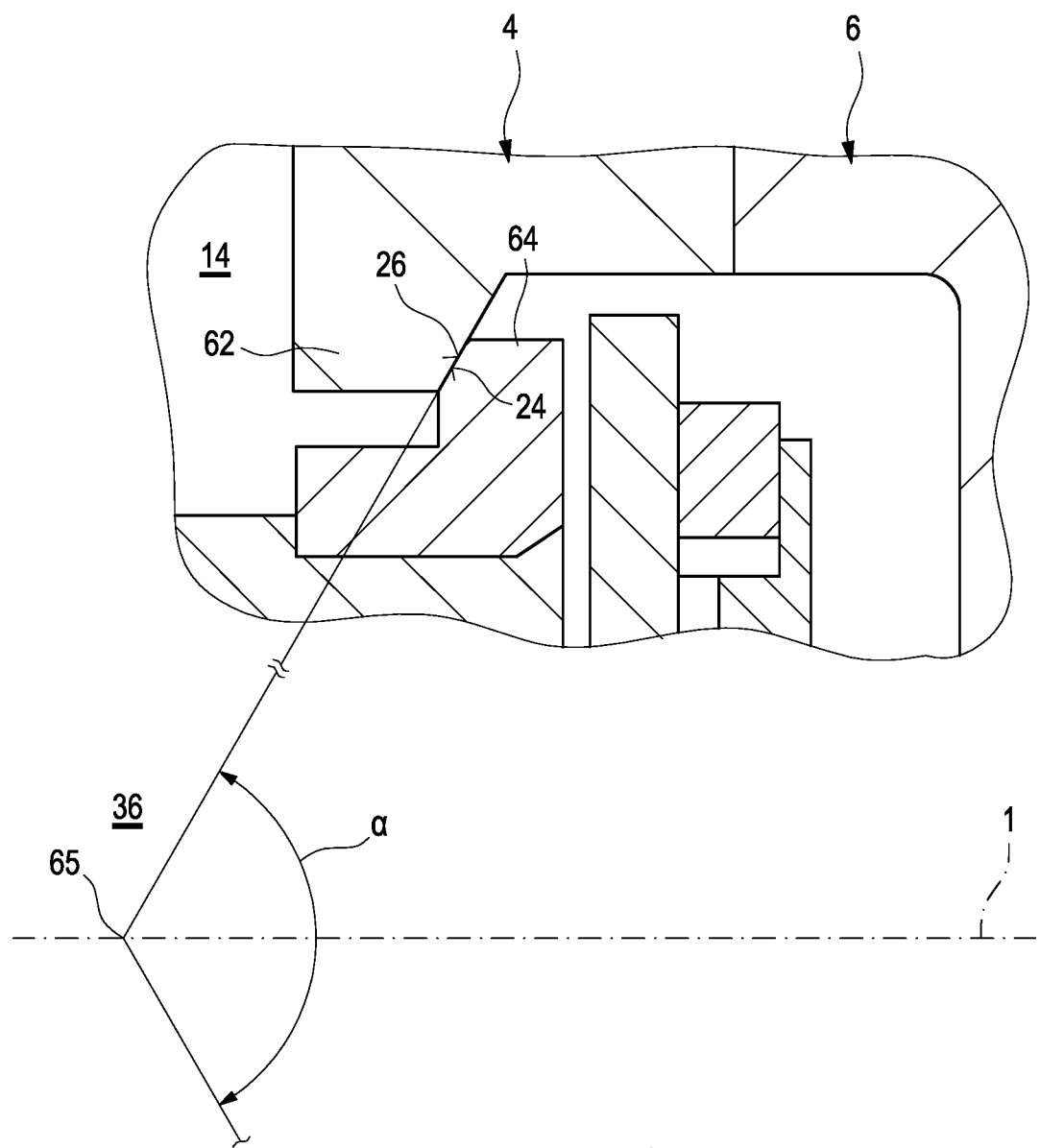
FIG. 2 shows the conical contact surfaces from FIG. 1 with the associated cone angle in a schematic illustration.

As can be seen from an overview of FIG. 1 and the schematic illustration according to FIG. 2, a cone angle α forms at the conical contact surface 26 of the guide vane ring 22, whose vertex 65 lies on the axis of rotation 1 in the direction which axially faces the exhaust gas outlet 36.

The other conical contact surface 24 which is directly arranged on the turbine casing 4 exhibits the same cone angle α. Because the two conical contact surfaces 24, 26 exhibit the same cone angle α, the vertex 65 of the cone angle α in respect of the contact surface 24 lies also on the axis of rotation 1 in the direction which axially faces the exhaust gas outlet 36.

The size of the cone angle α is selected in such a manner that it is ensured that the reduction of a preload of the spring 20 due to thermal expansions of the components of the exhaust gas turbocharger 2 during its operation is compensated. In particular, the size of the cone angle α may be selected such that the preload is maintained constant.

The cone angle α of the two contact surfaces ranges from 120° to 150°. In particular, the cone angle α may be approx. 138°.

In an optional embodiment, another spring type is provided instead of the disc spring. It is also possible to provide multiple disc springs.

In further optional embodiments, only the one of the two contact surfaces 24 or 26 is conically formed. The other contact surface may, for example, be formed crowned.

The material matching and the cone angle α of the contact surfaces 24, 26 ensure that at the conical centering no self-locking may occur in the direction of the axis of rotation 1.

The two centering contact surfaces 24, 26 need not be arranged radially outside in the contact area of the guide vane ring 22 and the turbine casing 4, but may also be disposed further radially inward. In addition, the contact surface 26 need not be arranged on the turbine casing 4, but may also be, for example, disposed on the bearing housing 6 which is immovably connected with the turbine casing 4.

The invention claimed is:

1. An exhaust gas turbocharger, comprising:
   a turbine casing (4);
   a turbine wheel (10) which is rotatably arranged relative to an axis of rotation (1) within the turbine casing (4);
   a guide vane ring (22) which is non-rotatably arranged within the turbine casing (4); and
   variable guide vanes (44) which are arranged upstream of the turbine wheel (10) with respect to an exhaust gas flow, the variable guide vanes (44) being a part of the guide vane ring (22),
   wherein the guide vane ring (22) is centered by a matched pair of two contact surfaces (24, 26) pressed against each other with respect to the turbine casing (4), of which at least one contact surface (24 or 26, respectively) is conical, and
   wherein the at least one conical contact surface (26) is disposed at a radial outer zone (61) of the guide vane ring (22).

2. The exhaust gas turbocharger according to claim 1, wherein the matched pair of two contact surfaces (24, 26) forms a seal which essentially separates a space (14) within the exhaust gas flow from a holding space (60), and
   wherein a connection mechanism (58) is arranged in the holding space (60), and
   wherein the connection mechanism (58) connects swivel shafts (42) for varying the variable guide vanes (44) to an actuating device (66) for rotating the swivel shafts (42).

3. The exhaust gas turbocharger according to claim 1, wherein the at least one conical contact surface (26) is arranged directly at the guide vane ring (22), and
   wherein on the at least one conical contact surface (26) a cone angle (α) is formed whose vertex (65) lies on the axis of rotation (1) in a direction which axially faces an exhaust gas outlet (36).

4. The exhaust gas turbocharger according to claim 3, wherein the cone angle (α) is in a range from 120° to 150°.

5. The exhaust gas turbocharger according to claim 1, wherein a further one of the two contact surfaces (24) is conical and is arranged directly at the turbine casing (4), and
   wherein on the further conical contact surface (24) a cone angle (α) is formed whose vertex (65) lies on the axis of rotation (1) in a direction which axially faces an exhaust gas outlet (36).

6. The exhaust gas turbocharger according to claim 5, wherein the cone angle (α) is in a range from 120° to 150°.

7. The exhaust gas turbocharger according to claim 1, wherein the two contact surfaces (24, 26) are both formed conically and
   wherein their matched materials and their cone angles (α) ensure that no self-locking can occur at the conical centering in a direction of the axis of rotation (1).

8. The exhaust gas turbocharger according to claim 1, wherein the two contact surfaces (24, 26) contact each other in a direction of the axis of rotation (1) under preload of a spring (20).

9. The exhaust gas turbocharger according to claim 8, wherein the spring is a disc spring.

10. The exhaust gas turbocharger according to claim 8, wherein the two contact surfaces (24, 26) are essentially disposed in an axial area of the spring (20) and of a heat shielding plate (16) which is axially arranged between the spring (20) and the turbine wheel (10).

11. The exhaust gas turbocharger according to claim 10, wherein the heat shielding plate (16) has a radial clearance relative to the guide vane ring (22) or a bearing housing (6), which is large enough to ensure centering by the two contact surfaces (24, 26).

12. The exhaust gas turbocharger according to claim 3, wherein the two contact surfaces (24, 26) are formed conically and have an identical cone angle ($\alpha$), which ensures that a reduction of a preload due to thermal expansions of components of the exhaust gas turbocharger (2) during its operation is compensated.

13. The exhaust gas turbocharger according to claim 1, wherein the variable guide vanes (44) are pivotably mounted on a base ring (38) of the guide vane ring (22), which comprises a radially projecting annular collar (64) at which the one conical contact surface (26) is arranged which contacts the other conical contact surface (24) which is arranged at a radially inward extending shoulder (62) of the turbine casing (4) and wherein the other conical contact surface (24) is arranged at a side of the shoulder (62) facing away from a turbine spiral channel (14), while the side of the shoulder (62) facing the turbine spiral channel (14) is formed as part of an inner wall (63) of the turbine spiral channel (14).

14. The exhaust gas turbocharger according to claim 1, wherein the two contact surfaces (24, 26) are configured conically and without protrusions so that the guide vane ring (22) may be steplessly fixed at the turbine wheel (10) in various angular positions about the axis of rotation (1).

\* \* \* \* \*

UNITED STATES PATENT AND TRADEMARK OFFICE
CERTIFICATE OF CORRECTION

PATENT NO.        : 11,220,957 B2                                   Page 1 of 1
APPLICATION NO.   : 17/043186
DATED             : January 11, 2022
INVENTOR(S)       : Marc-Pierre Weiß

It is certified that error appears in the above-identified patent and that said Letters Patent is hereby corrected as shown below:

On the Title Page

Between items (65) Prior Publication Data and (51) Int. Cl. insert:
--(30) Foreign Application Priority Data
Jun. 27, 2018 (DE) ............... 10 2018 115 448.8--

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*